(12) United States Patent
Xu et al.

(10) Patent No.: US 9,599,785 B2
(45) Date of Patent: Mar. 21, 2017

(54) FIBER MODULE RACK SYSTEM

(71) Applicant: ALLIANCE FIBER OPTIC PRODUCTS, INC., Sunnyvale, CA (US)

(72) Inventors: Gang Xu, Guangdong Province (CN); Kuo-Fu Hsu, New Taipei (TW); Shuang-Qiang Liu, Guangdong Province (CN); Yao Li, Newark, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 15/200,262

(22) Filed: Jul. 1, 2016

(65) Prior Publication Data

US 2017/0010432 A1 Jan. 12, 2017

Related U.S. Application Data

(60) Provisional application No. 62/231,521, filed on Jul. 9, 2015.

(51) Int. Cl.
*G02B 6/44* (2006.01)
*G02B 6/38* (2006.01)

(52) U.S. Cl.
CPC ......... *G02B 6/4452* (2013.01); *G02B 6/3897* (2013.01); *G02B 6/4453* (2013.01)

(58) Field of Classification Search
None
See application file for complete search history.

(56) References Cited

U.S. PATENT DOCUMENTS

2008/0089656 A1* 4/2008 Wagner .................... H04Q 1/13
385/135
2011/0268405 A1* 11/2011 Cote .................... G02B 6/4452
385/135

* cited by examiner

*Primary Examiner* — Hemang Sanghavi
(74) *Attorney, Agent, or Firm* — Dinsmore & Shohl LLP

(57) ABSTRACT

The present disclosure illustrates to a fiber module rack system in which a rack includes receiving spaces which each is formed by two frame plates of a base panel. Shell bodies of fiber optic cassettes are mounted in the receiving spaces, and a fiber module is disposed at a front part of the shell body, and a resilient locking member is disposed between the sliding track and at least one side of the shell body, so that the user can quickly and easily dismount the fiber optic cassettes from the rack without using tool.

12 Claims, 12 Drawing Sheets

FIBER MODULE RACK SYSTEM

This reference is based on Provisional Application Ser. No. 62/231,521, filed on Jul. 9, 2015.

BACKGROUND OF THE INVENTION

1. Field of the Invention

The present disclosure relates to a fiber module rack system, more particularly to a rack having receiving spaces which each is formed by two frame plates of a base panel of the rack, wherein shell bodies of fiber optic cassettes are separately mounted in the receiving spaces, and a fiber module is disposed at a front part of the shell body, and a resilient locking member is disposed on the shell body and between the sliding track and at least one side of the shell body, so that the user can quickly and easily dismount the fiber optic cassette from the rack without using tool.

2. Description of the Related Art

In recent year, as communication technology and Internet Network are rapidly developed, data center and telecommunication venders continuously make effort in products with high density, high transmission rate, large volume and intelligent functions. In order to satisfy requirements in higher data transmission rate, smaller occupied space and lower power consumption, many companies pay more attention in a cabling system which is an important constituent of physical infrastructure. Electric cable and optical fiber transmission systems are two basic transmission mediums in the cabling system of the data center. Compared with the electric cable transmission system, the optical fiber transmission system has advantages of larger bandwidth, higher transmission rate, longer transmission distance, thinner volume, stronger anti-EMI and excellent confidentiality, so the optical fiber transmission system is bound to be the trend in the future.

Moreover, in the optical fiber transmission system, an optical fiber connector is a device having no light source and most used in connection between the optical fibers, and the optical fiber connector is disassemble. Two end surfaces of two optical fibers are connected with precise alignment by an optical fiber connector, to transmit optical signal outputted from the optical fiber of a transmitter to the optical fiber of a receiver by a maximal coupling rate. General optical fiber connectors have numerous types. Compared with conventional system using LC, SC or ST optical fiber connector for the optical fiber with single core or dual cores, the current high-density fiber pre-connection system applies MPO (multi-fiber push-on)/MTP (multi-fiber terminated push-on) optical fiber connector to support the optical fiber having at least twelve cores, so as to meet requirement for less occupied space, high-density and high-efficiency installation, and high transmission rate. MPO/MTP module is mounted in rack-type optical fiber containing box, and selectively in cooperation with the SC optical fiber connector for 12-core fiber or the LC optical fiber connector for 24-core fiber.

A rack-type optical fiber containing box is widely applied to optical fiber splicing, wiring, arrangement, and the fiber terminal apparatus in testing between the optical fiber transmission systems, to serve as a hub for signal transmission, control and conversion between the optical signal receiving and transmitting apparatus, so as to implement functions of optical signal management and transfer. The rack-type optical fiber containing box can be mainly divided into several categories respectively compliant with 1RU, 2RU, 4RU and 8RU of specifications. Basically, the 1RU (that is, a rack unit) rack has a 19-inch width and a 1.72-inch height and is used to receive multiple detachable high-density fiber optic cassettes inside. The single MPO fiber module can divide the 12-core MPO connector into twelve single-core optical fiber connectors, so sockets of twelve or twenty-four single-core optical fiber connectors are disposed on a front panel of the rack, and sockets of one or two MPO connectors are disposed on back side of the rack.

Optical fiber leads are disposed inside the high-density fiber optic cassette to connect the sockets on the panel and the socket of the MPO connector; alternatively, the sockets on the panel are indirectly in pre-connection first and then disposed inside an optical fiber distribution box. In addition, the LC or SC of optical fiber coupling connector can be selectively applied in the optical fiber distribution box upon requirement. Above-mentioned optical fiber distribution box can provide advantages of flexible disposal and management for the data center and the machine room. When the quantity of devices or optical fiber connectors in requirement is changed, or location of apparatus or cable is changed, the user can easily add, remove or replace the high-density fiber optic cassette.

However, subject to the standard size of the given specification of 1RU rack, the manufacturer must research how to install more optical fiber connectors in the limited space and simplify difficulty in configuration of the high-density fiber optic cassettes received inside the rack-type optical fiber containing box, and difficulty in the manners of fastening, dismounting and replacement, so as to satisfy the requirement for optimizing space configuration of the high-density fiber optic cassettes and effectively solving the problem of limited bandwidth due to insufficient transmission channels. However, the conventional high-density fiber optic cassette is fastened in the rack-type optical fiber containing box by screw-locking manner, so the user must operate a tool to align the screw with the thread hole first for further locking operation, which results in long working hour, inconvenience and significantly-increased time in maintenance and replacement. That is, the structural design of the conventional high-density fiber optic cassette is hard to effectively save working hour and cost and is lack of practicability. If a new structural design of the rack-type optical fiber containing box can have a more compact size and is easy to dismount from the rack and is simple in maintenance and replacement, the large number of rack-type optical fiber containing boxes can be properly arranged in the data center and machine room with a higher density, whereby the user can operate the rack system easily, and working hour and cost loss of manpower wasting in maintenance and replacement can be effectively reduced.

SUMMARY OF THE INVENTION

In order to solve above-mentioned problems, the inventor collects relevant data to develop the fiber module rack system of the present disclosure according to various evaluations and considerations, long-term experience, and multiple tests.

A primary objective of the present disclosure is to provide a fiber module rack system in which a rack includes a plurality of frame plates disposed on a base panel thereof and arranged in interval, and each two adjacent frame plates define a receiving space, a plurality of track members are disposed on two opposite sidewalls of the receiving space, the track member has at least one retaining hole formed on an inside wall thereof and adjacent to front opening of the receiving space, so that shell bodies of the fiber optic cassettes can be respectively mounted in the receiving spaces of the rack, the sliding tracks at two opposite sides of the shell body can be respectively mounted into the track members, and a resilient locking member formed between the sliding track and at least one side of the shell body is clasped in the retaining hole for stably being blocked and positioned and preventing withdrawal. The user can laterally press a pulling member of the resilient locking member to simultaneously release the protrusion from the retaining hole, and the shell body of fiber optic cassette can be removed out from the rack. Therefore, the user can easily and quickly mount or dismount the fiber optic cassette without using tool, which results in working hour and cost saving and further achieves effects of stable structure and simple operation and improves production efficiency and convenience in maintenance and replacement.

A secondary objective of the present disclosure is to provide the base panel of the rack comprising an outer cover disposed at the top thereof, and the outer cover has hollow parts cut therethrough and respectively extended backwardly from the front opening, the shell body of the fiber optic cassette includes an outer shell and a top lid, and top lid has a bent edge formed at a front part thereof and folded backwardly, and step-like bent edge of the top lid can be flushed with the outer cover of the rack after the fiber optic cassette is inserted into the rack completely, so that the space of the rack with limited height can be used efficiently. In normal application, the optical fiber connectors arranged in parallel and plugged with the fiber module have gaps to allow the user's finger to plug or pull the optical fiber connectors without using extra tool. The fiber optic cassettes longitudinally stacked in the receiving spaces of the rack have an installation gap in vertical direction, so that various types of optical fiber connectors can be operated without using any installation tool and not interfered with each other.

Another objective of the present disclosure is to provide the fiber optic cassette in which the outer shell and the bent edge of the top lid have a plurality of openings adjacent to the installing holes and horizontally arranged in interval, and the fiber module has an optical fiber connector disposed in a docking slot behind a socket thereof and a locking member disposed at the top thereof for being clasped in the docking slot and exposed out of the opening. There is no operating space for the user's finger subject to the limited space of the chamber inside the shell body, so the user can operate a tool (such as tweezers or a screwdriver) to press the locking member of the optical fiber connector through the opening, to dismount the locking member from the docking slot of the socket, so that the optical fiber connector can be removed to complete the operation of disassembly.

Another objective of the present disclosure is that when the fiber optic cassettes are respectively mounted into the receiving spaces of the rack, the sliding tracks of the shell body are slid into and constrained by the track members of the frame plate, so that the fiber optic cassettes can be smoothly inserted into the receiving spaces of the rack. The sliding track and the track member of the frame plate are respectively made by metal and non-metal materials, so the friction therebetween can be maximally reduced to prevent their surface from scratch or damage during long-term use. With self-lubricating property of the material of the frame plate and good structural strength of the material of the sliding track, the fiber optic cassette can be supported better and inserted into the rack more easily and smoothly.

Another objective of the present disclosure is that when the user wants to remove the fiber optic cassettes from the rack, the user can just laterally press the pulling member of the resilient locking by single hand, to resiliently deform the pulling member about the bent section to move the pulling member towards the fiber module, and simultaneously release the protrusion from the retaining hole of the front part of the frame plate, and then pull the pulling member outwardly, so that the sliding tracks of the shell body can be moved out along the track members of the two adjacent frame plates. The resilient locking member is made by metal material and has good elasticity to not easily produce metal fatigue, so that the user can have elastic feeling in pressing.

Another objective of the present disclosure is that the rack is separated by the plurality of frame plates to form the plurality of receiving spaces for receiving the six fiber optic cassettes, and each of the fiber modules of the two fiber optic cassettes longitudinally stacked in one of the receiving spaces includes two sockets arranged in array, and each of the sockets has docking slots disposed at front and rear sides thereof and horizontally arranged in interval for connecting six single-core LC or SC optical fiber connectors, so as to assemble the rack compliant with the standard specification of 1RU. The rack can totally provide 216 single-core LC or SC optical fiber connectors for further connection. The socket of the fiber module can be replaced by simplex or duplex MPO connector upon actual application, so that more optical fiber connectors can be installed in the fiber optic cassette with the higher density.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1:
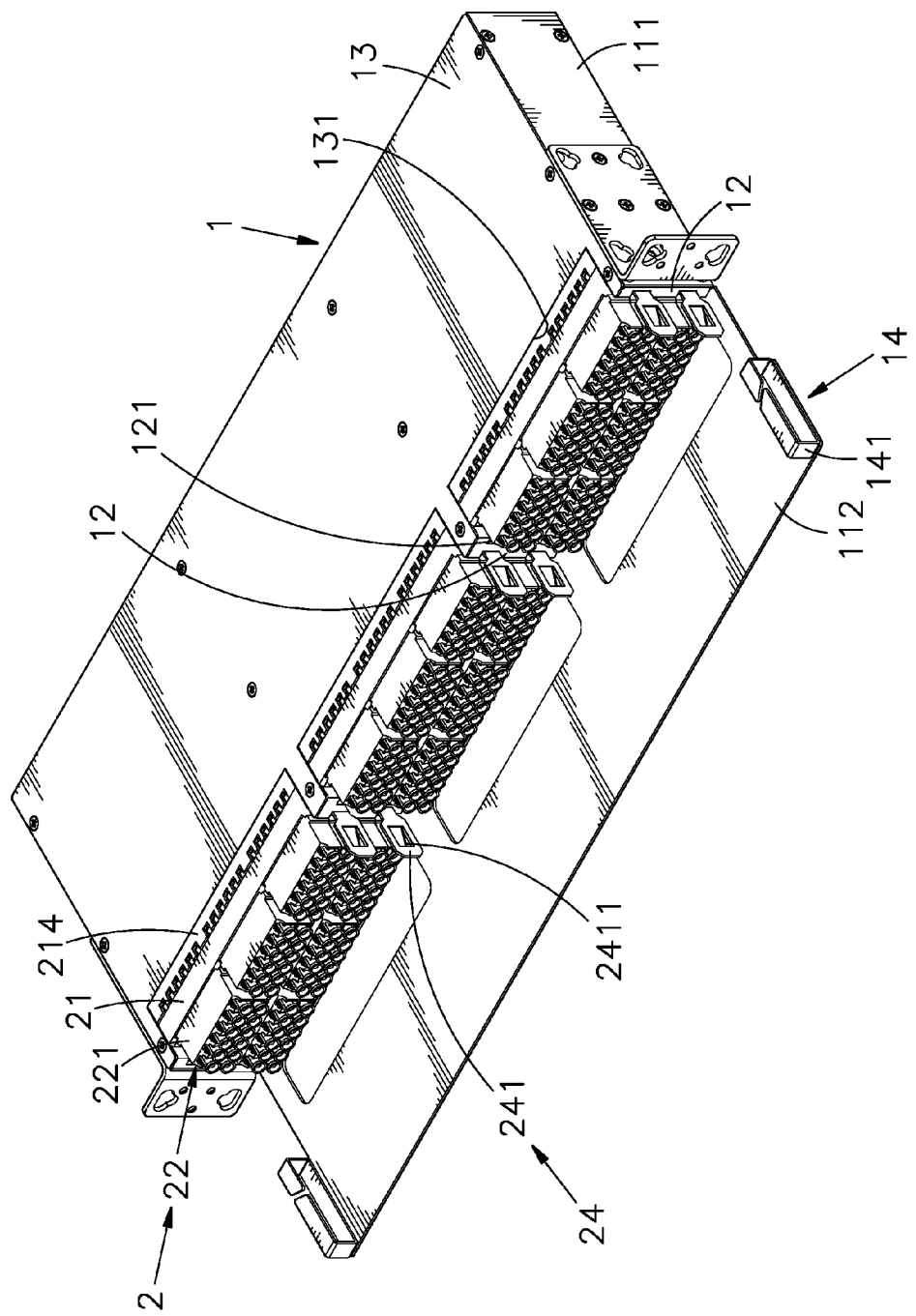
FIG. 1 is an elevational view of an embodiment of the present disclosure.
Figure 2:
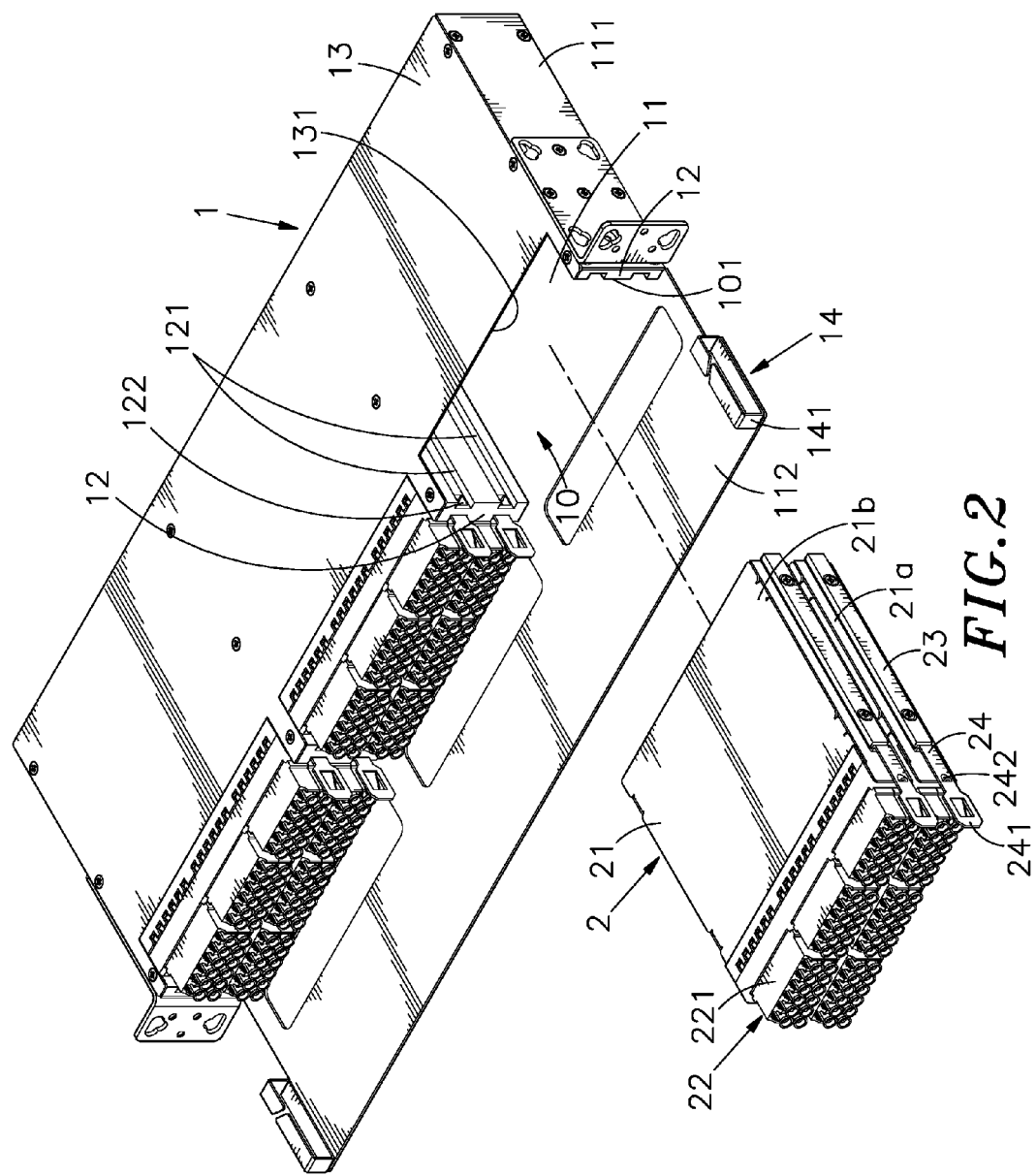
FIG. 2 is an exploded view of a rack and fiber optic cassettes of the present disclosure.
Figure 3:
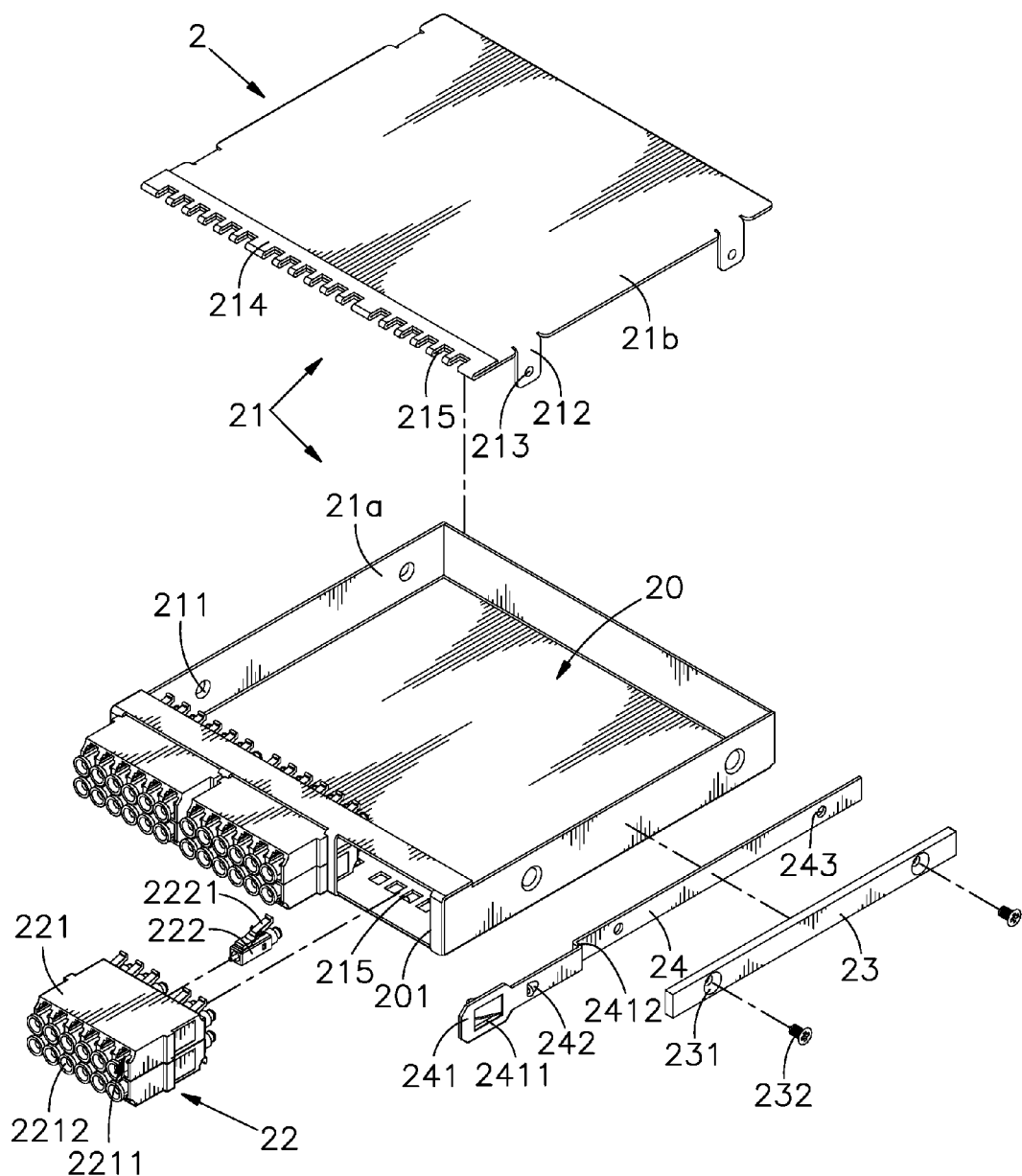
FIG. 3 is an exploded view of the fiber optic cassette of the present disclosure.
Figure 4:
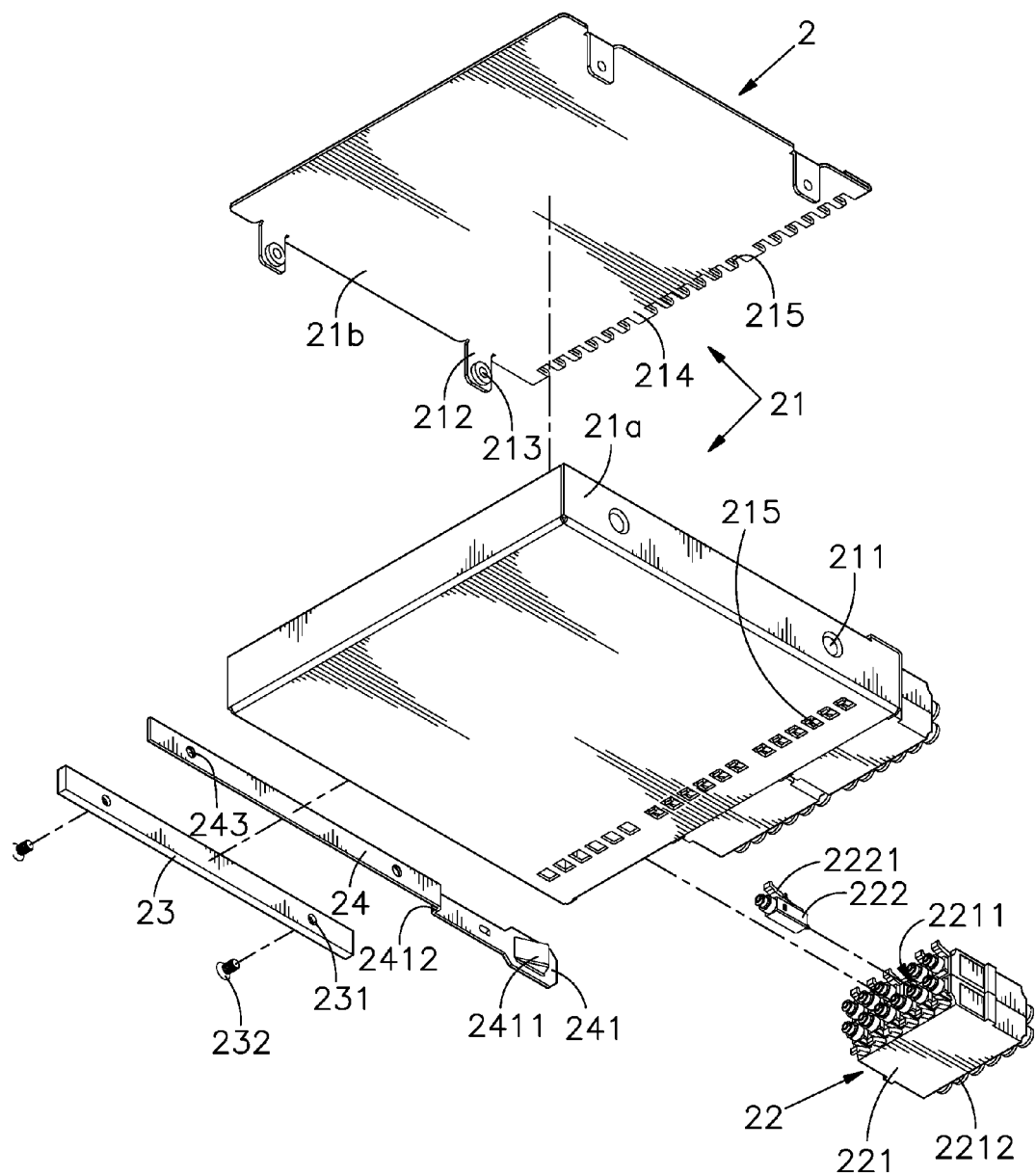
FIG. 4 is an exploded view of the fiber optic cassette of the present disclosure, when viewed from another angle.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms.

The terms are used only for the purpose of distinguishing one component from another component. Thus, a first element discussed below could be termed a second element without departing from the teachings of embodiments. As used herein, the term "or" includes any and all combinations of one or more of the associated listed items.

Please refer to FIGS. 1 through 4 which show elevational view, exploded view of a rack and fiber optic cassettes, exploded view of the fiber optic cassette, and other exploded view of the fiber optic cassette when viewed from another angle. As shown in FIGS. 1 through 4, the fiber module rack system of the present disclosure includes a rack 1 and a plurality of fiber optic cassettes 2.

Figure 5:
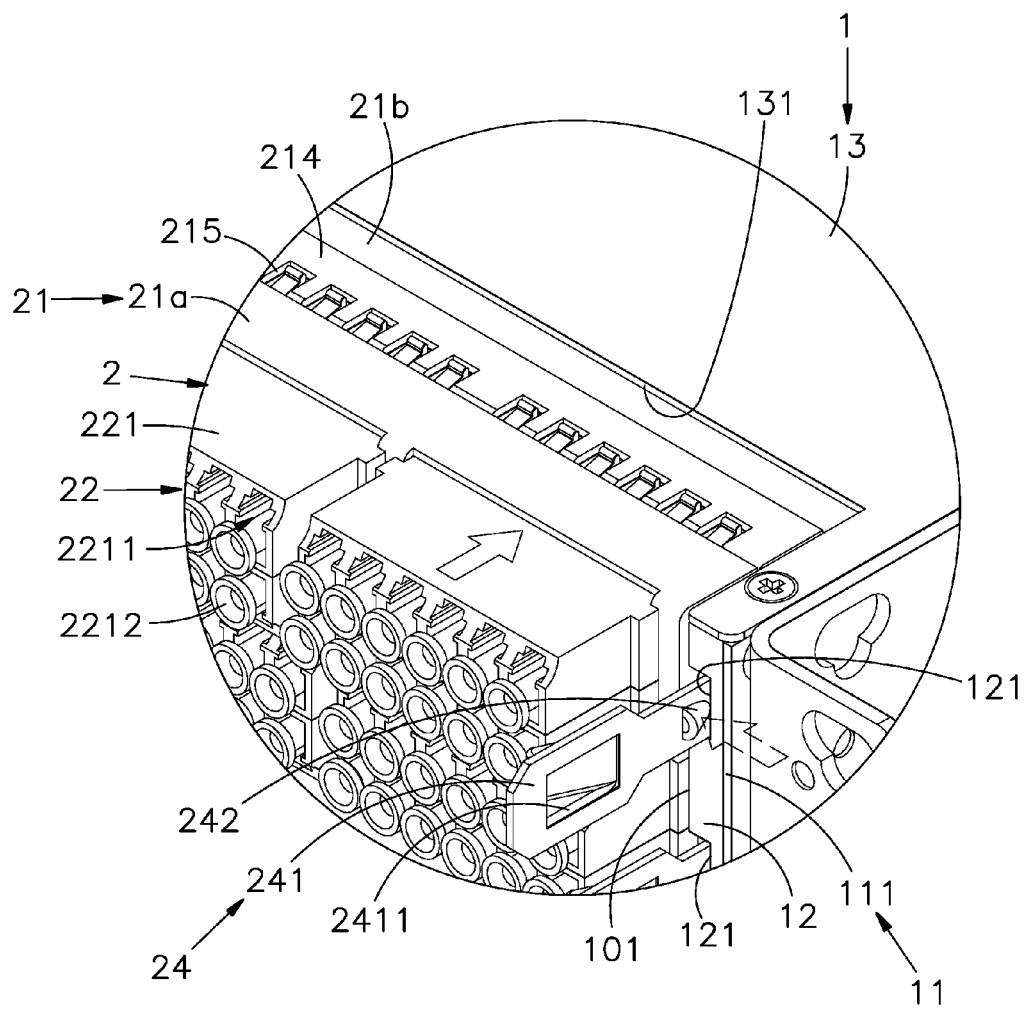
FIG. 5 is an elevational view of the fiber optic cassette being inserted into the rack, in accordance with the present disclosure.
Figure 6:
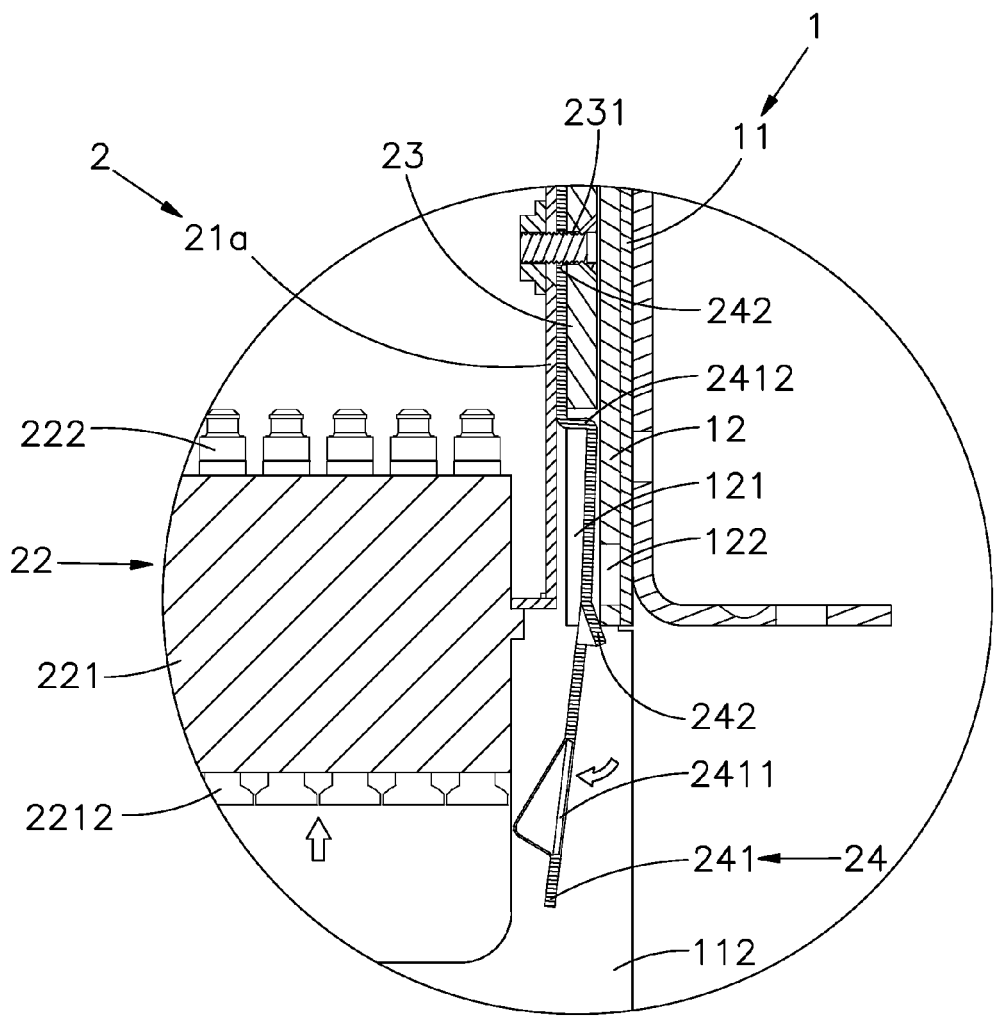
FIG. 6 is a top sectional view of a part of the fiber optic cassette being inserted into the rack, in accordance with the present disclosure.
Figure 7:
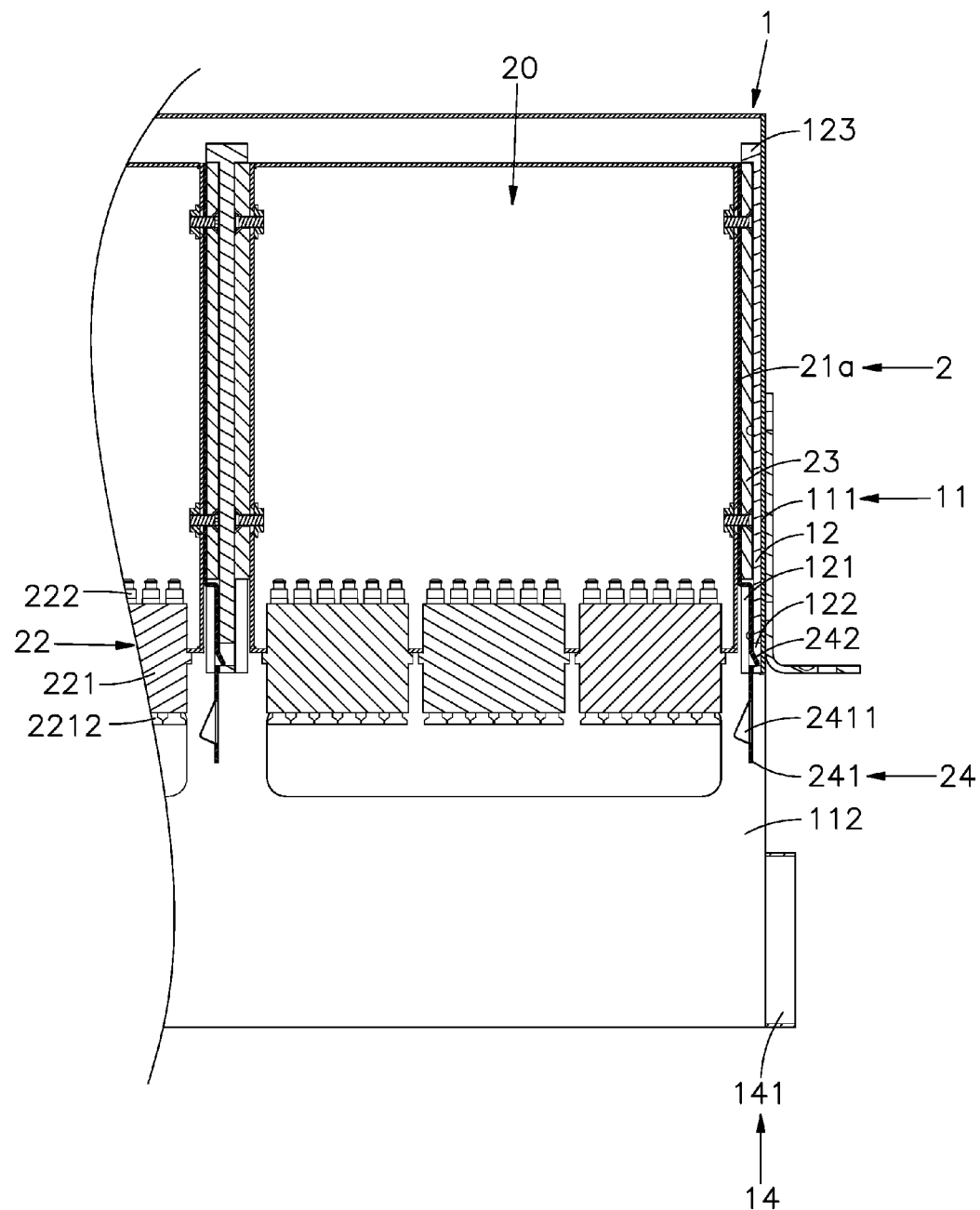
FIG. 7 is a top sectional view of the fiber optic cassette inserted into the rack, in accordance with the present disclosure.
Figure 8:
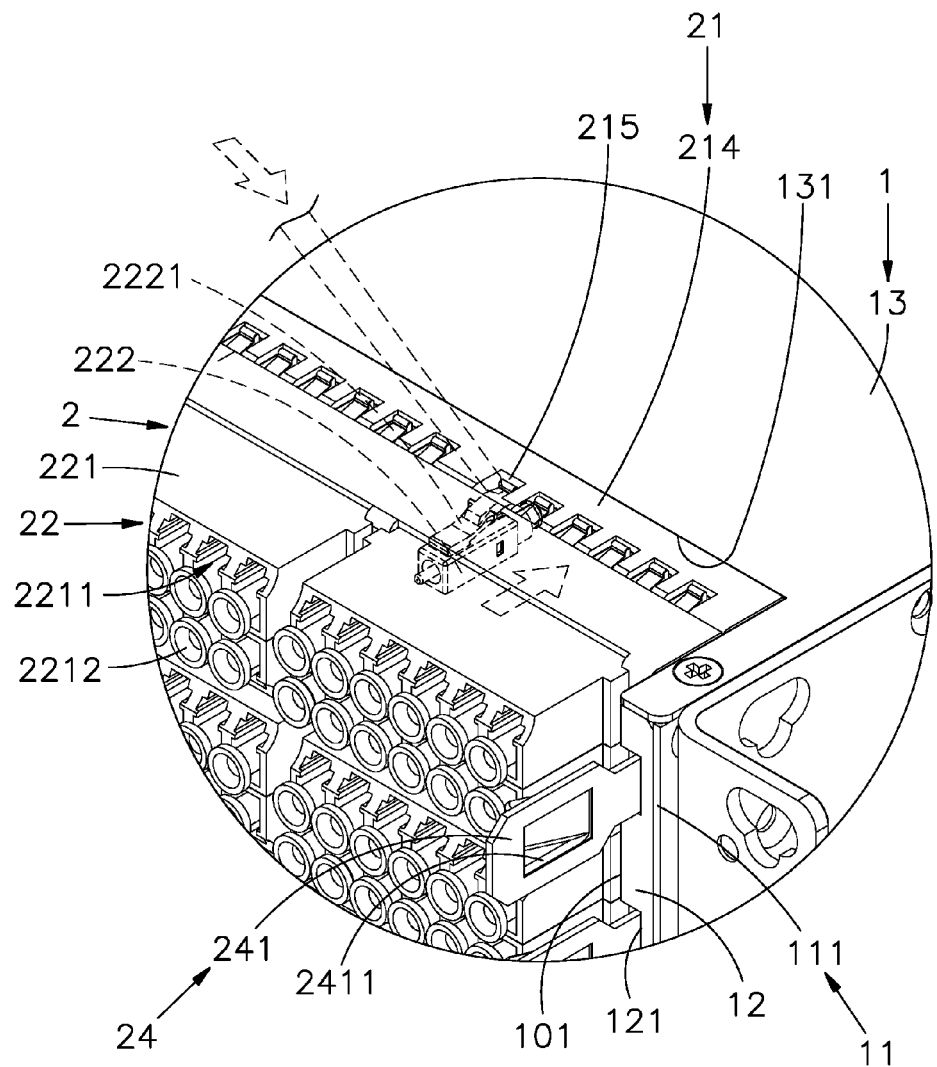
FIG. 8 is an elevational view of a part of the optical fiber connector before disassembly, in accordance with the present disclosure.

The rack 1 is compliant with a specification of 1RU (that is, a rack unit), and includes a base panel 11 and two side panels 111 disposed uprightly at two opposite sides of the base panel 11, and a plurality of frame plates 12 disposed uprightly between the two side panels 111 and laterally arranged in interval, an outer cover 13 disposed on top parts of the plurality of frame plates 12. Two adjacent frame plates 12 of the rack 1 define a receiving space 10 which is provided with an opening 101 at the front thereof, and two opposite sidewalls of the receiving space 10 are respectively formed with a plurality of track members 121 which are extended backwardly from front edges of the opening 101 and vertically arranged in interval. The track members 121 of the right sidewall correspond in position to that of the left sidewall. In addition, each of the track members 121 is formed with at least one retaining hole 122 (as shown in FIGS. 5 through 7) adjacent to the opening 101, and formed with an upright stop part 123 disposed at rear end thereof and protruded towards receiving space 10. A pallet 112 is outwardly extended from the bottom of the base panel 11, and includes cable organizers 14 respectively disposed in the front thereof and spaced apart from the two side panels 111. Each of the cable organizers 14 has at least one cabling ring 141. The outer cover 13 is formed with hollow parts 131 cut through a front edge thereof and extended backwardly from the opening 101 respectively.

Each of the fiber optic cassettes 2 includes a shell body 21 which is hollow, has an outer shell 21a and a top lid 21b, and laterally defines a chamber 20 inside. A plurality of fiber modules 22 are respectively disposed in a plurality of installing holes 201 formed at the front of the chamber 20. The plurality of installing holes 201 are arranged in an array. Each of the fiber modules 22 has a plurality of sockets 221. The shell body 21 further includes sliding tracks 23 respectively disposed at two opposite sides thereof and extended along long sides thereof, and a resilient locking member 24 disposed between at least one side thereof and the sliding track 23. The resilient locking member 24 is formed by metal material integrally and has a pulling member 241 which is suspended and extended outwardly and has a pull-tab 2411. The pulling member 241 is formed with a bent section 2412 adjacent to a front end of the sliding track 23 and bent outwardly by right angle, and an arc-shaped protrusion 242 disposed on an outer side of the pulling member 241 and between the pull-tab 2411 and the bent section 2412.

The outer shell 21a of the shell body 21 has a plurality of holes 211 formed on two opposite sides thereof respectively, and the top lid 21b has a plurality of lug members 212 disposed at two opposite sides thereof and downwardly bent into the chamber 20. Each of the lug members 212 has locking holes 213 corresponding in position to the holes 211, and the top lid 21b has a step-like bent edges 214 backwardly folded from a front edge thereof and abutted with an upper surface thereof The step-like bent edge 214 is flushed with the outer shell 21a. Each of the lower side of the outer shell 21a and the upper side of the bent edge 214 of the top lid 21b is provided with a plurality of openings 215 disposed at the front part thereof and adjacent to the installing holes 201, and horizontally arranged in interval. The sliding track 23 has a plurality of through-vias 231, and the resilient locking member 24 has a plurality of through-holes 243, and the through-vias 231 and the through-holes 243 respectively correspond in position to the holes 211, and the sliding track 23 has screws 232 respectively inserted in the through-vias 231 thereof. The screws 232 are respectively inserted through the holes 211 of the outer shell 21a, or through the through-holes 243 of the resilient locking member 24 first and through the hole 211 of the outer shell later, to be locked into the locking holes 213 of the top lid 21b, so that the two sliding tracks 23 and at least one resilient locking member 24 are combined with two opposite sides of the shell body 21 integrally by the screw-locking manner.

The socket 221 of the fiber module 22 has one or more docking slots 2211 arranged in interval and having inserting holes at front and rear sides thereof in communication with each other, and a removable dust-proof boot 2212 respectively inserted through the docking slot 2211 from the front of the socket 221, and optical fiber connector 222 disposed in the docking slot 2211 at the rear end thereof. The optical fiber connector 222 can be a simplex or duplex of LC, SC or MPO connector. Each of the optical fiber connectors 222 has a suspended locking member 2221 disposed at a top thereof and used to clasp the docking slot 2211, and the locking member 2221 is correspondingly exposed to the opening 215 of the shell body 21 corresponding thereto, so that the optical fiber lead (not shown in figures) disposed in the chamber 20 of the shell body 21 can be easily connected to the optical fiber cable, and the optical fiber connectors 222 can be respectively inserted into the docking slots 2211 at rear ends of the sockets 221, to complete the pre-connection action in the fiber optic cassette 2.

In addition, the four frame plates 12 of the rack 1 are respectively disposed at left and right sides and around middle location of the rack 1, and each two of the fiber optic cassettes 2 are longitudinally stacked in the receiving space 10 defined between the two frame plates 12. The frame plate 12 can be made by plastic or non-metal material with properties of self-lubricating and wearing resistance. The sliding track 23 of the fiber optic cassette 2 can be made by metal material and have properties of good structural strength and high wearing resistance, so as to stably support the fiber optic cassette 2 without being deformed easily.

In the rack 1 of the present disclosure, the plurality of frame plates 12 are used to form the plurality of receiving spaces 10 for receiving six fiber optic cassettes 2, each of the fiber modules 22 of each two fiber optic cassettes 2 longitudinally stacked in the receiving space 10 has two sockets 221 arranged in reversed direction, and three fiber modules 22 are disposed in array at the front part of the fiber optic cassette 2. Each socket 221 is provided with six docking slots 2211 horizontally arranged in interval at the front part thereof, to form a LC or SC connector for connecting six simplex LC or SC optical fiber connectors (not shown in figures), so as to assemble the rack 1 compliant with the 1RU standard specification.

The rack 1 can totally provide 216 simplex LC or SC optical fiber connectors for connecting with the plurality of sockets 221 of the fiber module 22. Alternatively, the fiber module 22 can include five or three sets of the sockets 221 arranged in array, and each set includes two sockets longitudinally stacked, and each socket 221 is provided with one or two docking slots 2211 arranged in interval at the front part thereof, so as to respectively form a MPO connector for connecting with ten 12-core simplex MPO optical fiber connectors (not shown in figures) or six 24-core duplex MPO optical fiber connectors (not shown in figures). However, the above-mentioned design for structure, type and quantity of the socket 221 of the fiber module 22 is just the preferred embodiment of the present disclosure, and can be modified upon actual application or requirement. The optical fiber connector 222, such as LC, SC or MPO, is mounted into the docking slot 2211 at the rear end of the socket 221, so the optical fiber lead can be performed the pre-connection, such as tail fiber splicing, coupling or cabling. Therefore, the fiber optic cassette 2 can contain more optical fiber connectors with a higher density in a given size compliant with the standard specification of the 1RU rack 1.

Please refer to FIGS. 5 through 9 which respectively show elevational view of the fiber optic cassette being inserted into the rack, the top section view of a part of the fiber optic cassette being inserted into the rack, top section view of the fiber optic cassette inserted into the rack, elevational views of a part of the optical fiber connector before and after dismounted. During assembly of fiber optic cassette 2 and the rack 1, the plurality of fiber optic cassettes 2 are respectively inserted into the receiving spaces 10 corresponding thereto in the rack 1, and the sliding tracks 23 of the shell body 21 are mounted into the track members 121 of the two frame plates 12, and the protrusions 242 of the resilient locking member 24 are abutted against the inside front wall of the track member 121, so that the protrusions 242 are pushed reversely by the track members 121 to resiliently deform the pulling member 241 about the bent section 2412 to generate inwardly displacement of the pulling member 241. The sliding track 23 and the track member 121 of the frame plate 12 are respectively made by metal and non-metal materials, so the friction therebetween can be maximally reduced, to prevent surface from scratch or damage during long-term use, and ensure the fiber optic cassette 2 to smoothly enter the receiving space 10 of the rack 1, whereby all fiber optic cassettes 2 can be slidably inserted into the rack 1 smoothly.

After the fiber optic cassette 2 is wholly inserted into the receiving space 10 of the rack 1, the front end of the sliding tracks 23 is blocked by the stop part 123 at the rear end of the frame plate 12, the protrusion 242 of the resilient locking member 24 is slid into one of the retaining holes 122 of the frame plate 12, and the pulling member 241 can clasp one of the protrusions 242 of the resilient locking members 24 in the retaining hole 122 of the frame plate 12 corresponding thereto after resilient deformation and reset process, so as to achieve effect of stably blocking and positioning, and preventing withdrawal. The fiber modules 22 mounted in the front parts of the plurality of fiber optic cassettes 2 can be respectively exposed out of the front opening 101 of the receiving space 10 of the rack 1, to form an array configuration. The three fiber optic cassettes 2 disposed more highly inside the rack 1 are blocked in the inside wall of the hollow parts 131 by the bent edge 214 of the top lid 21b and flushed with the upper surface of the outer cover 13, and the openings 215 are respectively exposed out of the hollow parts 131. After the above-mentioned actions are performed, the assembly of the fiber optic cassettes 2 and the rack 1 of the present disclosure is completed.

Figure 9:
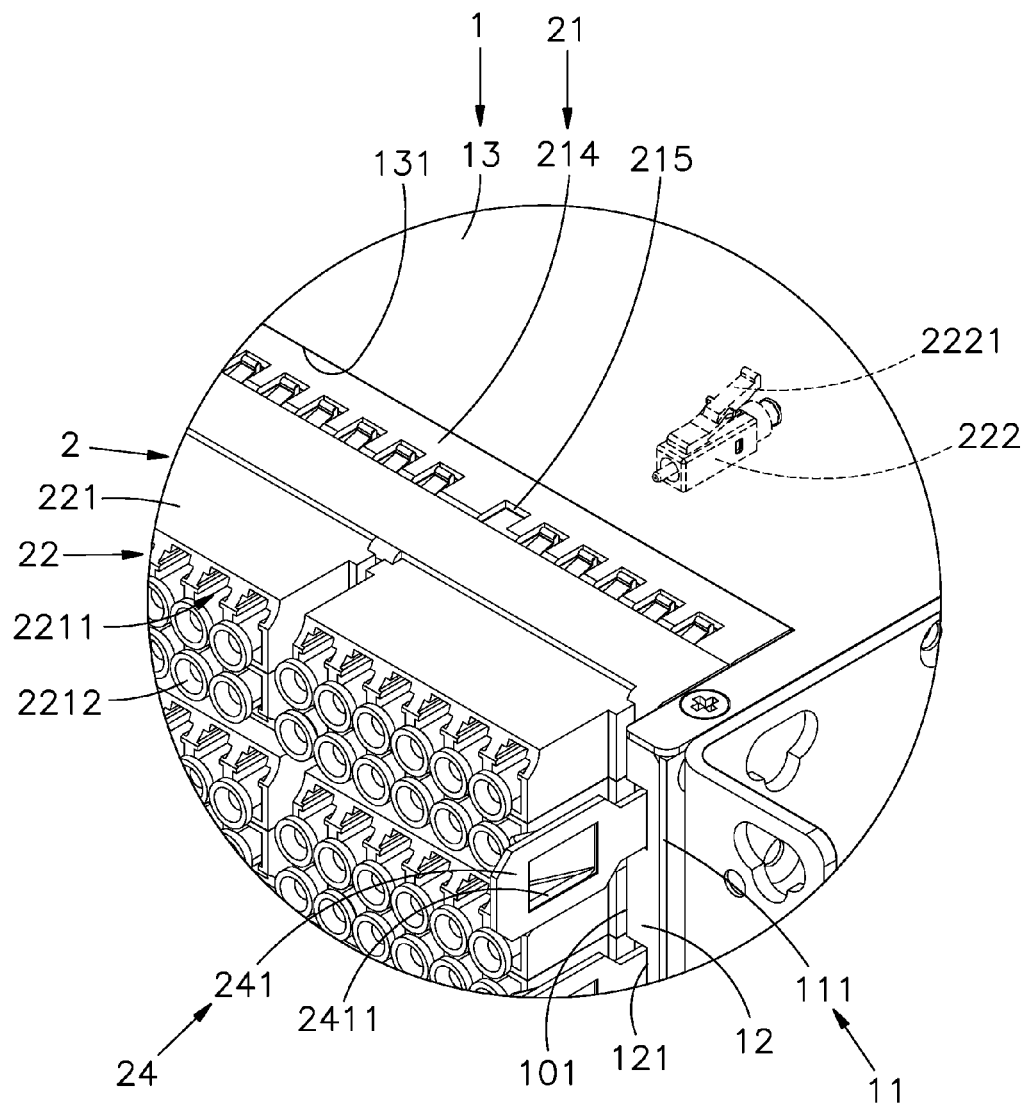
FIG. 9 shows appearance of a part of the optical fiber connector after disassembly, in accordance with the present disclosure.
Figure 10:
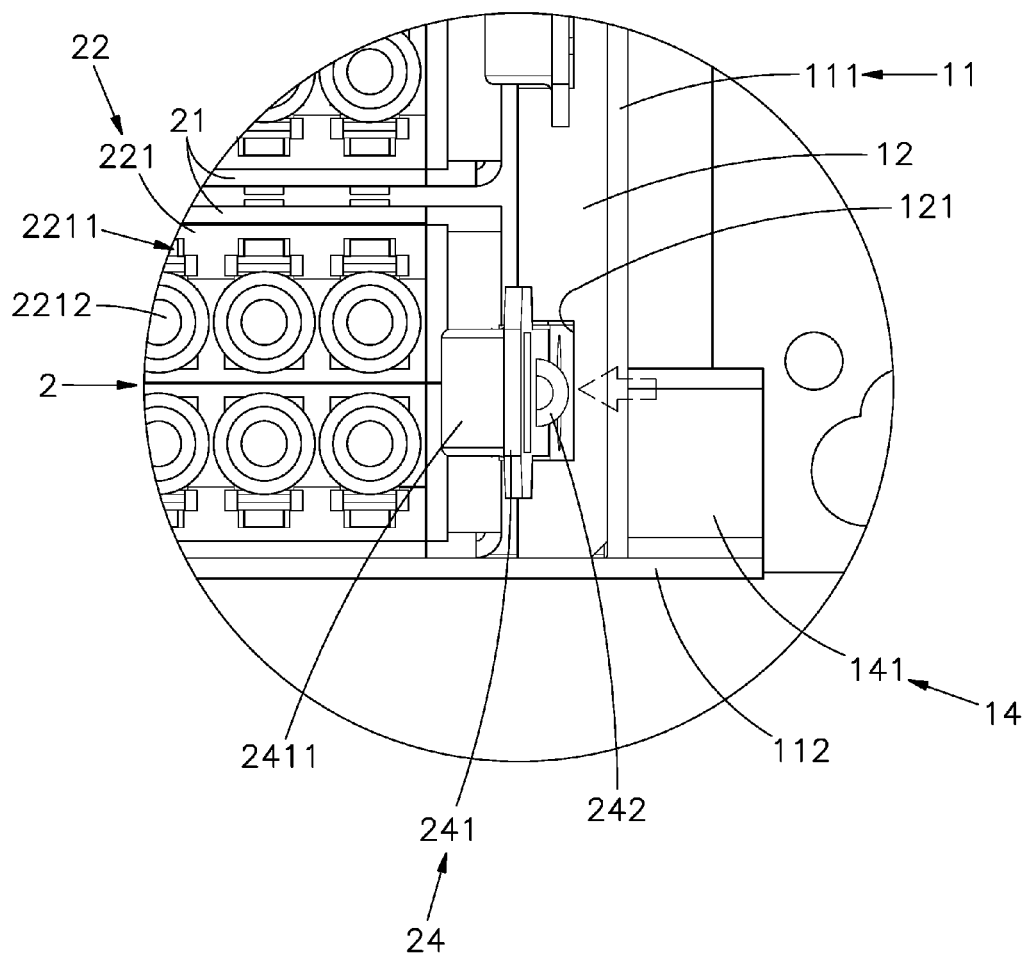
FIG. 10 is a front view of a part of the fiber optic cassette to be removed from the rack, in accordance with the present disclosure.

Please refer to FIGS. 9 and 10. By manner of designing the step-like bent edge 214 of the top lid 21b of the shell body 21, the fiber optic cassettes 2 can be flushed with the outer cover 13 of the rack 1 after being inserted into the rack 1, so as to effectively use the space of the rack 1 with the limited height, whereby in normal application the optical fiber connectors (not shown in figures) arranged in parallel and plugged into the sockets 221 of the fiber module 22 have gaps to allow the user's finger to plug or pull the optical fiber connector without using extra tool. The fiber optic cassettes 2 longitudinally stocked in the receiving spaces 10 of the rack 1 have an installation gaps in vertical direction, so that various types of optical fiber connectors can be operated without using any installation tool and not interfered with each other.

In addition, when the user wants to dismount the optical fiber connector 222, which is mounted at the rear end of the fiber module 22, from the socket 221, there is no operating space for the user's finger subject to the limited space of the chamber 20 inside the shell body 21, so the user can just operate a tool (such as tweezers or a screwdriver) to dismount the optical fiber connector 222 mounted inside the shell body 21 through the plurality of square holes opening 215 disposed on the outer shell 21a and the top lid 21b. Through the opening 215, the user can operate the tool to press the locking member 2221 of the optical fiber connector 222 down, to release the locking member 2221 from the docking slot 2211 of the socket 221, to enable the optical fiber connector 222 to be pulled back, so that the process of dismounting can be completed.

Figure 11:
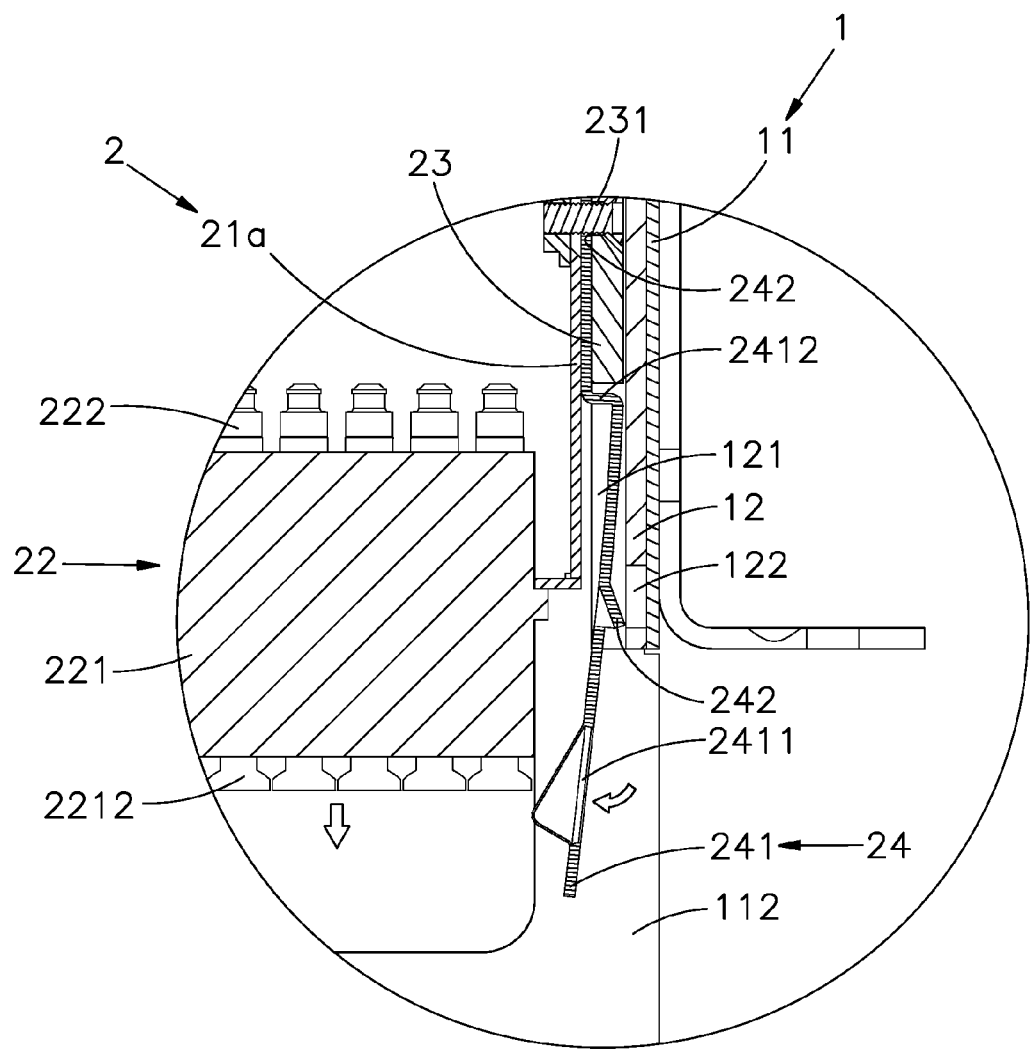
FIG. 11 is a top sectional view of a part of the fiber optic cassette to be removed from the rack, in accordance with the present disclosure.
Figure 12:
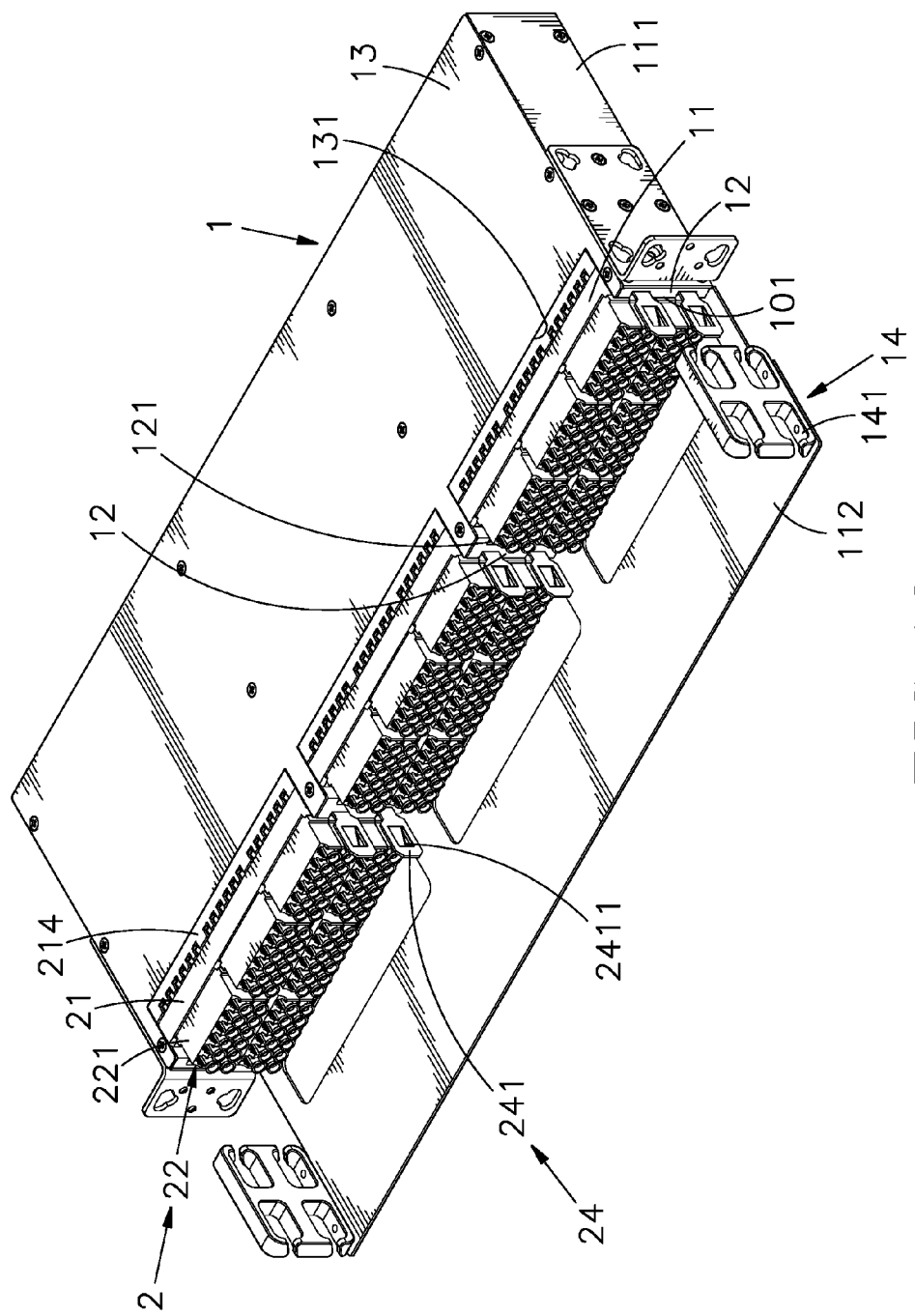
FIG. 12 is an elevational view of a preferred embodiment of the present disclosure.

Please refer to FIGS. 10 through 12 which show front view, top section view of a part of the fiber optic cassette before being pulled out, and an elevational view of the preferred embodiment of the present disclosure. As shown in FIGS. 10 through 12, the cable organizers 14 disposed at two sides of the front part of the rack 1 respectively have rectangle cabling rings 141, the plurality of optical fiber connectors (not shown in figures) of one end of the optical fiber cable are passed through or fastened in the cabling rings 141, respectively. Next, after being fastened by a cable tie, the optical fiber connectors can be respectively inserted into the corresponding docking slots 2211 at the front parts of the sockets 221 of the fiber module 22. However, the cable organizer 14 can be modified to have four rectangle cabling rings 141 arranged in array, upon actual application or requirement.

When wanting to remove the fiber optic cassette 2 from the receiving space 10 of the rack 1, the user can just laterally press the pulling member 241 of the resilient locking member 24 at one side of the shell body 21 by single hand, to resiliently deform the pulling member 241 about the bent section 2412 to move the pulling member 241 towards the fiber module 22, and simultaneously release the protrusion 242 from the retaining hole 122 of the front part of the frame plate 12, so that the user then pulls the pull-tab 2411 of the pulling member 241 outwardly, and the sliding tracks 23 of two opposite sides of the shell body 21 can be moved out along the corresponding track members 121 of the two frame plates 12. The resilient locking member 24 is made by metal material integrally, and has good elasticity to not easily produce metal fatigue, so that the user can have elastic feeling in pressing.

During the process of removing out the fiber optic cassette 2, the protrusion 242 of the resilient locking member 24 is released from the retaining hole 122 of the frame plate 12, and the resilient locking member 24 can be pulled or the fiber optic cassette 2 can be quickly pulled out from the receiving space 10 of the rack 1 after the resilient deformation and reset process. The plurality of fiber optic cassettes 2 can be mounted into the rack 1 without using screw for fastening, and the sliding tracks 23 at two opposite sides of the shell body 21 can be easily slid along the track members 121 of the two frame plates 12, and protrusion 242 of the resilient locking member 24 can be clasped in the corresponding retaining hole 122 of the frame plate 12 for be positioned, whereby the user can easily and quickly mount or dismount the fiber optic cassettes 2, so as to effectively save the working hour and cost wasting in assembly or disassembly, achieve the effect of stable structure and easy operation, and improve production efficiency and convenience in maintenance and replacement.

In the present disclosure, the rack 1 includes a plurality of frame plates 12 disposed on the base panel 11 thereof, each two frame plates 12 define the receiving space 10, and the plurality of track members 121 are respectively formed on the two opposite sidewalls of the receiving space 10, the fiber optic cassettes 2 are respectively mounted into the receiving spaces 10 of the rack 1, the sliding tracks 23 on the two opposite sides of the shell body 21 are respectively mounted into the corresponding track members 121 of the frame plate 12, the protrusion 242 of the resilient locking member 24 on at least one side of the shell body 21 is clasped in the retaining holes 122 on the inside wall of the track member 121 for being positioned. When wanting to remove out the fiber optic cassette 2 from the rack 1, the user can laterally press the pulling member 241 of the resilient locking member 24 to simultaneously release the protrusion 242 from the retaining hole 122, whereby the user can easily and quickly mount or demount the fiber optic cassettes 2, so as to effectively save the working hour and cost wasting in assembly or disassembly, achieve the effect of stable structure and easy operation, and improve production efficiency, practicability and convenience in maintenance and replacement.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A fiber module rack system comprising a rack and a plurality of fiber optic cassettes mounted inside the rack, wherein:

the rack comprises a base panel and a plurality of upright frame plates horizontally disposed on the base panel and arranged in interval, every two frame plates define a receiving space which has an opening at a front part thereof, and the rack comprises a plurality of track members respectively disposed on two opposite sidewalls of each of the receiving spaces, and the track member is provided with at least one retaining hole formed on an inside wall thereof adjacent to the opening;

wherein each of the plurality of the fiber optic cassette comprises a hollow shell body, a fiber module disposed at a front part thereof for connecting with preset optical fiber connectors, sliding tracks disposed on two opposite sides of the shell body for being inserted into the track members to receive the fiber optic cassette into the receiving space, and a resilient locking member is provided between the sliding track and at least one side of the shell body, and the resilient locking member comprises a pulling member suspended and extended outwardly from a front part thereof, and the pulling member has a protrusion disposed on outer side thereof for being clasped in the retaining hole.

2. The fiber module rack system according to claim 1, wherein the rack comprises side panels at two opposite sides of the base panel, and the plurality of frame plates are disposed between the two side panels, the rack comprises an outer cover which is disposed on the plurality of frame plates and has hollow parts cut therethrough and backwardly extended from the opening, the shell body of each of the plurality of fiber optic cassette comprises an outer shell and a top lid, and the top lid has a bent edge at a front edge thereof and folded backwardly, and the bent edge is blocked by the inside wall of the hollow part and flushed with an upper surface of the outer cover.

3. The fiber module rack system according to claim 2, wherein each of the plurality of the fiber optic cassettes comprises chambers formed inside the shell body horizontally, and a plurality of sockets of the fiber module respectively disposed in a plurality of installing holes which are arranged in array and at the front part of the chamber, and a plurality of openings are respectively formed on a lower surface of the outer shell and the bent edge of the top lid, and horizontally arranged in interval, and adjacent to the installing holes, and each of the fiber modules comprises at least one docking slot disposed in the socket thereof and horizontally arranged in interval, and comprises an optical fiber connector disposed in the docking slot behind the socket, and the optical fiber connector has a locking member disposed on a top thereof for being clasped in the docking slot and exposed out of the opening, so as to allow a preset tool to pass through the opening to press the locking member for unlocking, whereby the optical fiber connector is pulled out for disassembly.

4. The fiber module rack system according to claim 2, wherein the base panel of the rack has a pallet outwardly extended from a bottom thereof, and cable organizers disposed on the pallet and spaced apart from the two side panels by a distance, and each of the cable organizers has at least one cabling ring.

5. The fiber module rack system according to claim 1, wherein each of the frame plates of the rack has a stop part formed at a rear end of the track member and facing towards the receiving space for blocking the front end of the sliding track after the fiber optic cassette is inserted into the rack.

6. The fiber module rack system according to claim 1, wherein the two fiber optic cassettes are longitudinally stacked in the receiving space formed between each two adjacent frame plates of the rack, and the fiber modules are respectively mounted in the plurality of installing holes at the front of the chamber and arranged in array, each of the fiber modules comprises the plurality of sockets, and each of the sockets is provided with docking slots horizontally arranged in interval and respectively disposed at front and back sides thereof.

7. The fiber module rack system according to claim 6, wherein a LC, SC or MPO optical fiber connector is mounted in the docking slot behind the socket of the fiber module, and the optical fiber connector is simplex or duplex.

8. The fiber module rack system according to claim 1, wherein the shell body of each of the fiber optic cassettes comprises an outer shell and a top lid, the outer shell has a plurality of holes formed at two opposite sides thereof, and the top lid has locking holes respectively disposed on two opposite sides thereof and corresponding in position to the plurality of holes, and the sliding track has a plurality of through-vias corresponding in position to the holes, and the resilient locking member has a plurality of through-holes corresponding in position to the holes, and screws are respectively inserted through the through-vias of the sliding track, and after the screws are respectively inserted into the holes of the outer shell, or into the through-holes of the resilient locking member first and the holes of the outer shell, the screws are locked into the locking holes of the top lid to combine the outer shell and the top lid integrally.

9. The fiber module rack system according to claim 8, wherein the top lid of the shell body has a plurality of lug members disposed at two opposite sides thereof and downwardly bent into the chamber, and each of the plurality of lug members has a locking hole corresponding in position to one of the holes.

10. The fiber module rack system according to claim 1, wherein the pulling member of the resilient locking member of the fiber optic cassette has a pull-tab, a bent section formed adjacent to and before the sliding track and outwardly bent, and the protrusion formed at outer side thereof between the pull-tab and the bent section.

11. The fiber module rack system according to claim 1, wherein the rack is separated by the plurality of frame plates to form the plurality of receiving spaces for receiving the six fiber optic cassettes, and each of the fiber modules of the two fiber optic cassettes longitudinally stacked in one of the receiving spaces comprises two sockets arranged in array, so that total sockets are configured to connect with 216 simplex LC or SC optical fiber connectors.

12. The fiber module rack system according to claim 1, wherein each of the frame plates of the rack and each of sliding tracks of the fiber optic cassettes are respectively made by non-metal and metal material, and the resilient locking member is made by metal material.

* * * * *